United States Patent [19]
Webster

[11] Patent Number: 5,764,019
[45] Date of Patent: Jun. 9, 1998

[54] CONTROL CIRCUIT AND SYSTEM FOR A SWITCHED RELUCTANCE MACHINE AND METHOD OF OPERATING

[75] Inventor: Paul Donald Webster, Leeds, United Kingdom

[73] Assignee: Switched Reluctance Drives, Ltd., North Yorkshire, England

[21] Appl. No.: 807,191

[22] Filed: Feb. 27, 1997

Related U.S. Application Data

[63] Continuation of Ser. No. 472,954, Jun. 7, 1995, abandoned.

[30] Foreign Application Priority Data

Apr. 11, 1995 [GB] United Kingdom .............. 9507540

[51] Int. Cl.$^6$ ...................................... H02P 1/46
[52] U.S. Cl. .................. 318/701; 318/254; 318/138; 318/439
[58] Field of Search ..................... 318/701, 254, 318/138, 439, 245; 363/13, 52, 61, 81; 323/288, 345, 371, 271; 307/125, 127, 135

[56] References Cited

U.S. PATENT DOCUMENTS

| | | |
|---|---|---|
| 3,896,355 | 7/1975 | Guicheteau . |
| 4,684,867 | 8/1987 | Miller et al. ........................... 318/701 |
| 4,736,144 | 4/1988 | Chun-Pu . |
| 5,003,244 | 3/1991 | Davis, Jr. . |
| 5,032,968 | 7/1991 | Mikami et al. . |
| 5,115,181 | 5/1992 | Sood . |
| 5,155,289 | 10/1992 | Bowles . |
| 5,399,948 | 3/1995 | Yang . |
| 5,504,410 | 4/1996 | Davis .................................. 318/701 |
| 5,689,164 | 11/1997 | Hoft et al. ........................... 318/701 |

FOREIGN PATENT DOCUMENTS

| | | |
|---|---|---|
| 0662751 | 7/1995 | European Pat. Off. . |
| 2159672 | 12/1985 | United Kingdom . |
| WO9502922 | 1/1995 | WIPO . |

Primary Examiner—Karen Masih
Attorney, Agent, or Firm—Arnold, White & Durkee

[57] ABSTRACT

A control circuit for a switched reluctance machine comprises a transistor connected with the machine winding across a rectified ac power supply. The transistor controls the flow of current through the winding in a primary current path. A silicon controlled rectifier and a capacitor are serially connected across the power supply and a diode is connected between the winding and the transistor and between the silicon controlled rectifier and the capacitor. In the steady state, the capacitor is charged each time the transistor is opened. The transistor and the silicon controlled rectifier are actuated together so that the capacitor discharges through the silicon controlled rectifier and the winding until the capacitor is discharged below the supply voltage. Thereafter, the silicon controlled rectifier ceases conduction and energy is drawn from the supply. The circuit avoids the need for a dc link capacitor across the power supply to smooth the supply voltage.

19 Claims, 3 Drawing Sheets

1

CONTROL CIRCUIT AND SYSTEM FOR A SWITCHED RELUCTANCE MACHINE AND METHOD OF OPERATING

This application is a continuation of Ser. No. 08/472,954 filed Jun. 7, 1995 abandoned.

FIELD OF THE INVENTION

This invention relates to a control circuit for a switched reluctance machine which may be run as either a motor or a generator.

BACKGROUND OF THE INVENTION

The control and switching circuit connected with a switched reluctance machine and the machine itself may collectively be called a switched reluctance drive. These are generally known in the art, for example they are discussed in "THE CHARACTERISTICS, DESIGN AND APPLICATIONS OF SWITCHED RELUCTANCE MOTORS AND DRIVES," by Stephenson & Blake, Seminar 5, PCIM Conference, Nurnberg, Jun. 21 1993.

A typical switching circuit for a switched reluctance machine will include a so-called dc link capacitor arranged across the input terminals connected with the power supply. The purpose of the dc link capacitor is to smooth a relatively coarsely rectified ac input voltage such as a full-wave rectified 230 volts or 240 volts European ac mains supply or a 120 volt US ac mains supply.

In mass-produced articles it is desirable to reduce the component count and/or the size of control circuits wherever possible to reduce costs and the space taken up by them.

It is also found that the presence of a dc link capacitor has an adverse effect on the power factor of the switched reluctance machine, causing increased supply currents and, hence, some drop in efficiency.

It is an object of the present invention to provide a control circuit for a switched reluctance machine that avoids the use of a dc link capacitor for smoothing the input supply.

SUMMARY OF THE INVENTION

According to the present invention there is provided a control circuit for a switched reluctance machine phase which machine comprises a stator, a rotor and at least one phase winding associated with at least some of the stator poles of the or each phase, the control circuit comprising: first and second supply voltage input terminals, the first input terminal being connectable with one end of the winding; a switch arrangement connected with the winding and being operable to connect the winding with the second input terminal to create a primary winding current path; a capacitor and a thyristor having a trigger input, the capacitor and the thyristor being serially connected across the winding and the switch arrangement to form a secondary winding current path; and a unidirectional current device connected to conduct from between the winding and the switch arrangement to between the thyristor and the capacitor, the thyristor being operable to conduct in response to a trigger signal to the trigger input and to maintain conduction while the voltage across the capacitor exceeds a reference level.

When the switch arrangement is closed, the invention uses the secondary current path to enable the capacitor to discharge through the winding. When the capacitor is sufficiently discharged the thyristor ceases to conduct. The winding is then supplied from the supply which also charges the capacitor again, through the unidirectional current device, when the switch arrangement is subsequently opened.

The invention also extends to a switched reluctance drive system comprising: a switched reluctance machine having a rotor and a stator, respectively defining rotor and stator poles, and a phase winding associated with the or each phase of the machine; an electrical power supply; first and second supply voltage input terminals respectively connected across the power supply, the first input terminal being connected with one end of the winding; a switch arrangement connected with the winding and operable to connect the winding with the second input terminal to create a primary winding current path; a capacitor; a thyristor, having a trigger input, the capacitor and the thyristor being serially connected across the winding and the switch arrangement to form a secondary winding current path; and a unidirectional current device connected to conduct from between the winding and the switch arrangement to between the thyristor and the capacitor, the capacitor being chargeable through the winding and the unidirectional current device, when the switch arrangement is open circuit, to a voltage in excess of the voltage applied by the power supply across the first and second terminals and being dischargeable through the secondary current path when the switch arrangement and the thyristor are subsequently closed, the thyristor being operable to conduct in response to a trigger signal to the trigger input and to maintain conduction when the voltage across the capacitor is greater than the voltage across the first and second terminals and to become non-conducting when the voltage across the capacitor falls below a reference level.

Additionally, the invention extends to a method of controlling a switched reluctance machine having a rotor, a stator, a phase winding associated with at least some of the stator poles of the or each phase of the machine, means for sensing the position of the rotor in a conduction angle with respect to the stator and a control circuit as defined above, the method comprising:

actuating the switch arrangement of the control circuit and the thyristor to conduct at the beginning of the conduction angle of the phase and deactuating the switch arrangement to cease conducting at the end of the conduction angle of the phase; and repeating actuation of the switch arrangement and the thyristor and deactuation of the switch arrangement for each conduction angle of the or each phase.

BRIEF DESCRIPTION OF THE DRAWINGS

The present invention can be put into practice in various ways, some of which will now be described by way of example with reference to the accompanying drawings in which.

DETAILED DESCRIPTION OF THE INVENTION

Figure 1:
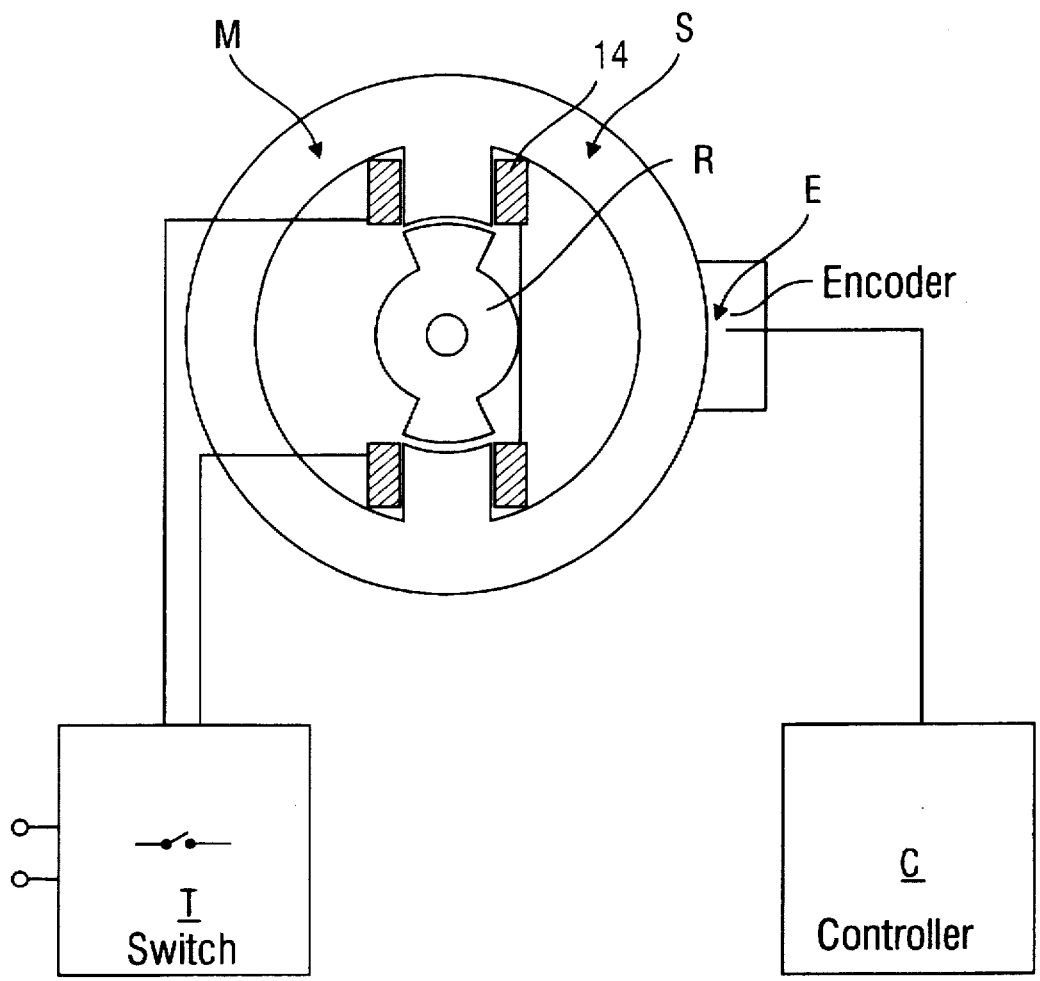
FIG. 1 is a schematic diagram of a known switched reluctance drive.

In FIG. 1 of the drawings a switched reluctance drive is shown. This comprises a single-phase machine M having a rotor R defining a pair of salient rotor poles, and a stator S defining a pair of salient stator poles. A controller C controls the switch T for connecting the winding 14 associated with the stator poles to the supply voltage according to the movement of the rotor in known manner. The rotor position is sensed by a rotor position encoder E.

The controlled switching required to effect rotation of a switched reluctance machine will be known to the skilled person and is discussed in detail in the PCIM '93 paper referred to above.

For motoring action, the winding is energized by switching on the switch T as a rotor pole approaches a stator pole. The switch is switched off to deenergize the winding generally before alignment of the rotor poles with the stator poles, since the direction of the developed torque reverses after alignment and would tend to oppose the movement of the rotor. The angular extent over which the switch T is conducting is known as the conduction angle and is generally determined by the desired output.

For generating action, the process is similar, except that the winding is typically energized as the poles are moving apart. The power flow is then from the shaft of the machine to the supply or some other sink of energy (not shown in the figures).

Figure 2:
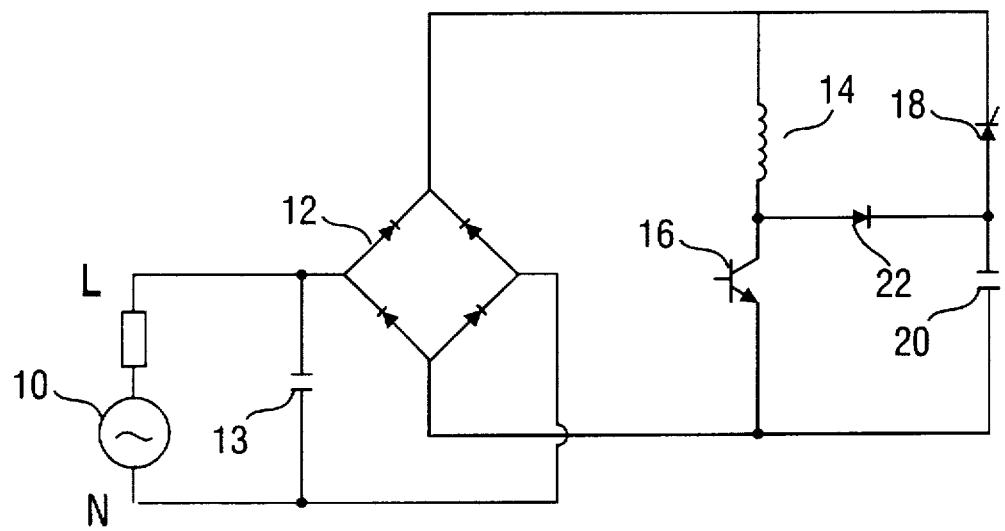
FIG. 2 is a diagram of a control circuit according to the invention.

Referring now to FIG. 2, an ac power supply 10 denotes a single-phase mains supply at 120 volts providing a maximum current of, say, 12 amps. This is typical of the US domestic electrical supply network. The ac power supply 10 is connected across the ac input terminals of a diode bridge 12 in conventional manner and a low-value snubber capacitor 13 is connected across the supply also in conventional manner. The diode bridge 12 produces a full-wave rectified dc output of about 110 volts. This is still subject to the characteristic ripple of a rectified ac supply with which the person of ordinary skill in the art will be familiar.

The motor winding 14 of the single-phase switched reluctance motor M is serially connected with an NPN transistor 16 across the output of the bridge 12. The collector of the transistor 16 is connected with the motor winding 14 and the emitter of the transistor 16 is connected with one side of the bridge dc output. Other types of switch arrangement could be used in place of the transistor 16. These may be other semi-conductor-based types, such as the power metal oxide silicon field effect transistor (MOSFET), the insulated gate bipolar transistor or a mechanical relay.

A silicon controlled rectifier (SCR) 18 and a capacitor 20 are serially connected across the winding 14 and the transistor 16. The anode of the SCR 18 is connected with the capacitor 20 and the cathode of the SCR 18 is commonly connected with the winding 14 and the positive output of the diode bridge 12. A diode 22 is connected between the winding 14 and the collector of the transistor 16 at its cathode end and between the SCR 18 and the capacitor 20 at its anode end.

The control circuit according to this invention is arranged so that the output of the rectifying bridge 12 has no dc link capacitor connected across it. The circuit of this embodiment of the invention functions as described below:

When the circuit is first initialized, by connecting the bridge 12 to the ac supply 10, the capacitor 20 will charge up by virtue of current flowing through the winding 14, diode 22 and capacitor 20. The voltage to which the capacitor 20 charges will depend on the peak value of the rectified mains, the parameters of the capacitor 20 and the length of time allowed for this initialization. Under ideal circumstances, the capacitor voltage might reach twice the peak value of the rectified mains.

When it is desired to start the motor (which could be almost concurrent with the start of the initialization process) the transistor 16 is made to conduct at the start of the conduction angle so that the motor winding 14 is energized. Simultaneously with actuation of the transistor 16 the SCR 18 is also fired. The capacitor 20 discharges through a secondary winding current path formed by the SCR 18, the winding 14 and the transistor 16, energizing the winding.

After a short time, the capacitor 20 will have discharged to, and then below, the rectified supply voltage from the bridge 12. The SCR 18 will become non-conductive when there is a reverse potential difference across it. The current through the winding 14 is then taken from the bridge 12 through the primary winding current path formed by the winding 14, the transistor 16 and the power supply 10.

At the end of the phase conduction angle, the transistor 16 is rendered non-conducting in order to initiate deenergization of the winding 14. When the transistor 16 ceases to conduct the continuing, but falling, current flow that exists by virtue of the inductive nature of the winding is diverted from the transistor 16 through the diode 22 to charge the capacitor 20. While the current continues to flow because of the inductance of the winding, the voltage across the capacitor 20 will rise steadily, exceeding the supply voltage, and this will effect deenergization of the winding. The current falls to zero and, when the current flow ceases, the diode ceases to conduct.

The magnetic flux created by the voltage across the motor winding during the conduction angle will produce torque in the rotor relative to the stator according to the conventional teaching of switched reluctance motor theory.

According to the timing required to cause rotation of the rotor, as the next alignment of stator and rotor poles approaches, the transistor 16 must be actuated again to conduct for another conduction angle. The circuit repeats the sequence of events described above for the second and subsequent cycles. However, the initial voltage across the capacitor is determined by the magnitude of the voltage to which it was charged at the end of the previous conduction cycle.

Figure 3:
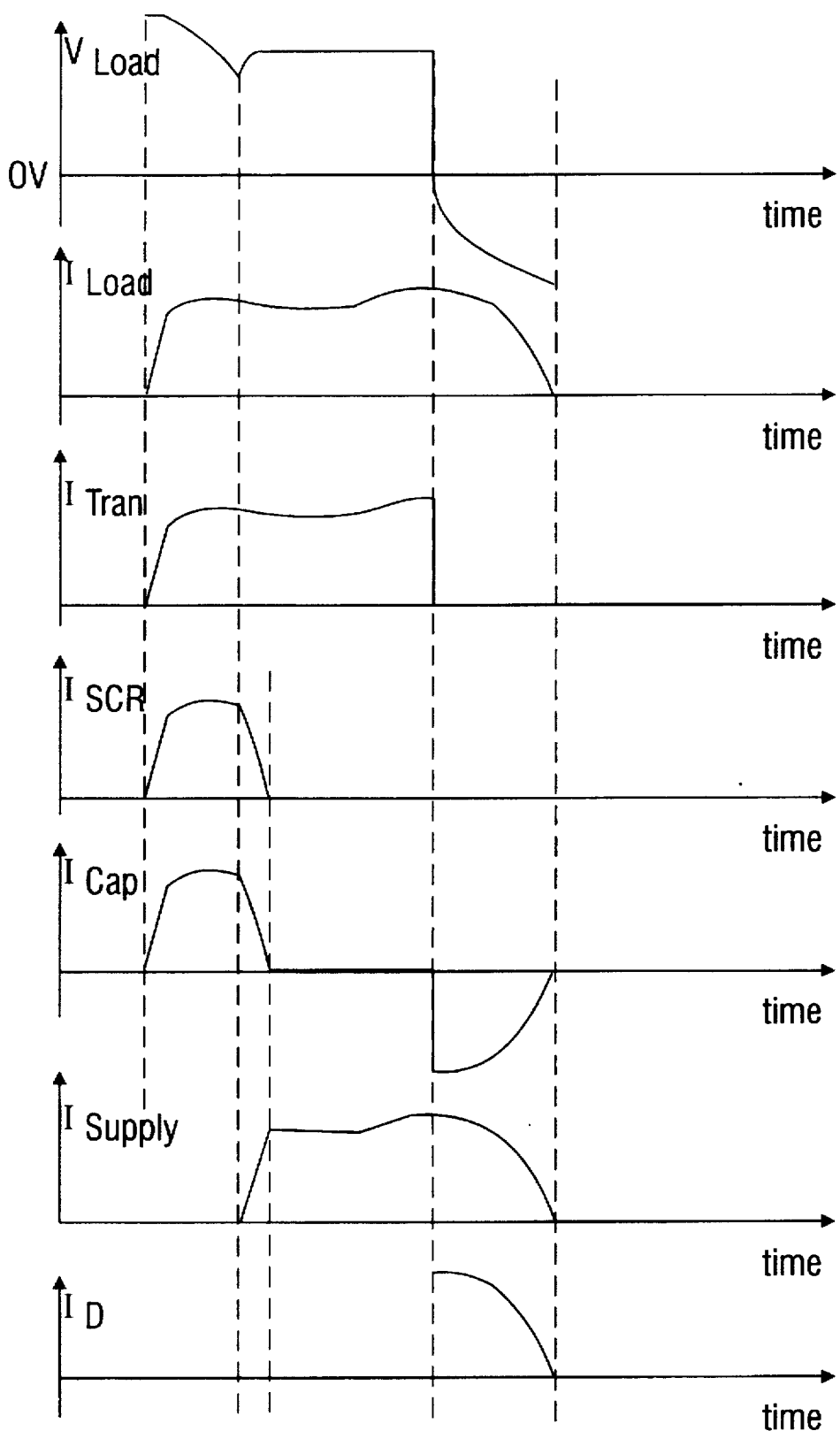
FIG. 3 is a timing diagram for operation of the circuit of FIG. 2 according to the invention.

A conduction cycle waveform timing diagram is shown in FIG. 3. $V_{LOAD}$ is the voltage across the winding and $I_{LOAD}$ is the winding current. The winding current is made up of an initial portion coincident with the current in the capacitor 20 ($I_{CAP}$) and the silicon controlled rectifier ($I_{SCR}$) through the secondary current path and a subsequent portion coincident with the rise in supply current ($I_{SUPPLY}$) before the transistor is switched off ($I_{TRAN}=0$). Thereafter $I_{SUPPLY}$ continues to flow through the diode ($I_D$) to charge the capacitor.

It will be recognized by those of ordinary skill in the art that, in the mass-production of domestic appliances, such as vacuum cleaners, the advantage of dispensing with a large dc link capacitor of the order of 1000 µfarads rated at 200V in favor of a small capacitor of around 20 µfarads rated at 400 volts dc, there is a net benefit in both space and component cost saving.

Furthermore, the improvement in the power factor as a result of eliminating the dc link capacitor means that a given drive can be run with lower supply currents. This can be a particular advantage, in terms of the domestic electrical supply network of the United States of America, where the 12 amp operating limit would otherwise be reached with a relatively small drive size. For example, a typical motor drive for a domestic appliance with an output of 1 kW may draw in excess of 2 kVA from the supply when it is run from a conventional control circuit. The improved power factor of the circuit of this invention would reduce the volt-ampere requirement of a 1 kW switched reluctance drive, to around 1.4 kVA, which is available from the 120V, 12A supply mentioned above.

It has also been found that there is a considerable reduction in the acoustic noise emitted by the machine when operated according to this invention. This is because there are less abrupt voltage changes across the winding 14.

The SCR 18 is a form of thyristor which is a general term for a device which is rendered conducting in one direction by a firing or trigger signal and will remain conducting until it is reverse biassed regardless of the subsequent state of the firing or trigger signal. Once the potential difference across the device is reversed, conduction ceases until the thyristor is triggered again. It will be apparent to the person of ordinary skill that other forms of switch could be used to perform this duty, such as insulated gate bipolar transistors, gate turn-off thyristors and the like.

While the control circuit of the invention has been described primarily in relation to a 120 volt ac supply, it is also applicable to other supplies. However, the circuit is particularly well suited to lower supply voltages because the voltage to which the capacitor 20 is exposed can be tolerated by components of conventional rating.

Figure 4:
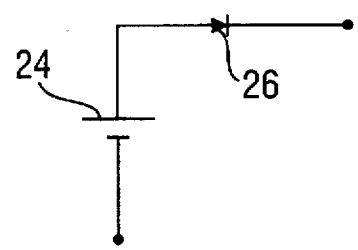
FIG. 4 is a circuit diagram of an alternative power supply for the circuit of FIG. 2.

It will be apparent to the person of ordinary skill that the invention is applicable also to each phase of a multi-phase switched reluctance machine. Also, while the invention has been described in relation to a rectified ac supply the supply could equally well be in the form of a dc source 24 and a blocking diode 26 as illustrated in FIG. 4.

As the winding of the switched reluctance machine is a form of inductive load, it will also be apparent to the person of ordinary skill in the art that the invention is equally applicable to any other inductive load requiring a switched dc input voltage supply.

While the invention has been described in connection with the illustrative embodiments discussed above, those skilled in the art will recognize that many variations may be made without departing from the present invention. Accordingly, the above description of several embodiments is made by way of example and not for the purposes of limitation. The present invention is intended to be limited only by the spirit and scope of the following claims.

What is claimed is:

1. A control circuit for a switched reluctance machine, the switched reluctance machine comprising a stator defining a plurality of stator poles, a rotor and at least one phase winding associated with at least some of the stator poles of the phase winding, the control circuit comprising: first and second supply voltage input terminals, the first input terminal being connectable with one end of the winding; a switch arrangement connected with the winding and being operable to connect the winding with the second input terminal to create a primary winding current path; a capacitor; a thyristor having a trigger input, the capacitor and the thyristor being serially connected across the winding and the switch arrangement to form a secondary winding current path; and a unidirectional current device connected to conduct from between the winding and the switch arrangement to between the thyristor and the capacitor, the thyristor being operable to conduct in response to a trigger signal to the trigger input and to maintain conduction while the voltage across the capacitor exceeds a reference level.

2. A circuit as claimed in claim 1 in which the thyristor is arranged to maintain conduction while the voltage across the capacitor exceeds the supply voltage.

3. A circuit as claimed in claim 1 in which the switch arrangement includes a transistor.

4. A circuit as claimed in claim 1 in which the unidirectional current device is a diode.

5. A circuit as claimed in claim 1 in which the first and second supply voltage input terminals are coupled across a power supply that includes a rectifier operable to derive a rectified voltage from an ac source.

6. A circuit as claimed in claim 5 in which the rectifier is a diode bridge full-wave rectifier.

7. A circuit as claimed in claim 1 in which the thyristor is operable to maintain conduction while the voltage across the capacitor is greater than the voltage across the first and second terminals.

8. A circuit as claimed in claim 2 in which the thyristor is operable to maintain conduction while the voltage across the capacitor is greater than the voltage across the first and second terminals.

9. A circuit as claimed in claim 5 in which the thyristor is operable to maintain conduction while the voltage across the capacitor is greater than the voltage across the first and second terminals.

10. A switched reluctance drive system comprising: a switched reluctance machine having a rotor and a stator, respectively defining rotor and stator poles, and a phase winding associated with the phase of the machine; an electrical power supply; first and second supply voltage input terminals respectively connected across the power supply, the first input terminal being connected with one end of the winding; a switch arrangement connected with the winding and operable to connect the winding with the second input terminal to create a primary winding current path; a capacitor; a thyristor having a trigger input, the capacitor and the thyristor being serially connected across the winding of the switch arrangement to form a secondary winding current path; and a unidirectional current device connected to conduct from between the winding and the switch arrangement to between the thyristor and the capacitor, the capacitor being chargeable through the winding and the unidirectional current device, when the switch arrangement is open circuit, to a voltage in excess of the voltage applied by the power supply across the first and second terminals and being dischargable through the secondary current path when the switch arrangement and the thyristor are subsequently closed, the thyristor being operable to conduct in response to a trigger input signal to the trigger input and to maintain conduction when the voltage across the capacitor is greater than the voltage across the first and second terminal and to become non-conducting when the voltage across the capacitor falls below a reference level.

11. A system as claimed in claim 10 in which the thyristor is arranged to maintain conduction while the voltage across the capacitor exceeds the supply voltage.

12. A system as claimed in claim 10 in which the switch arrangement includes a transistor.

13. A system as claimed in claim 10 in which the unidirectional current device is a diode.

14. A system as claimed in claim 10 in which the power supply includes a rectifier operable to derive a rectified voltage from an ac source.

15. A system as claimed in claim 14 in which the rectifier is a diode bridge full-wave rectifier.

16. A system as claimed in claim 10 in which the thyristor is operable to maintain conduction while the voltage across the capacitor is greater than the voltage across the first and second terminals.

17. A system as claimed in claim 10 further including means for sensing the position of the rotor with respect to the stator.

18. A method of controlling a switched reluctance drive system comprising: a switched reluctance machine having a rotor and a stator, respectively defining rotor and stator poles and a phase winding associated the phase of the machine; an electrical power supply; first and second supply voltage input terminals respectively connected across the power supply, the first input terminal being connected with one end of the winding; a switch arrangement connected with the winding and operable to connect the winding with the second input terminal to create a primary winding current path; a capacitor; a thyristor having a trigger input, the capacitor and the thyristor being serially connected across the winding and the switch arrangement to form a secondary winding current path, and a unidirectional current device connected to conduct from between the winding and the switch arrangement to between the thyristor and the capacitor, the capacitor being chargeable through the winding and the unidirectional current device, when the switch arrangement is open circuit, to a voltage in excess of the voltage applied by the power supply across the first and second terminals, and being dischargable through the secondary current path when the switch arrangement and the thyristor are subsequently closed, the thyristor being operable to conduct in response to a trigger input signal to the trigger input and to maintain conduction when the voltage across the capacitor is greater than the voltage across the first and second terminal and to become non-conducting when the voltage across the capacitor falls below a reference level; the method comprising the step of actuating the switch arrangement of the control circuit and the thyristor to conduct at the beginning of a conduction angle and deactuating the switch arrangement to cease conducting at the end of the conduction angle.

19. A circuit as claimed in claim 2 in which the switch arrangement includes a transistor.

* * * * *